though such forces may include components compressive in nature. Upon the application of an appropriate force, both the body and the prestressed bolt will sequentially fracture releasing the poppets allowing them to engage the seats and thereby close a fluid flow path through the coupling assembly.

United States Patent [19]
Badger

[11] 3,794,057
[45] Feb. 26, 1974

[54] SAFETY BREAKAWAY FLUID COUPLING
[75] Inventor: Everett H. Badger, La Habra, Calif.
[73] Assignee: Textron Inc., Providence, R.I.
[22] Filed: June 26, 1972
[21] Appl. No.: 266,179

[52] U.S. Cl. .................. 137/68, 137/614.02, 285/4
[51] Int. Cl. ...................... F16k 17/36, F16k 17/40
[58] Field of Search .................. 137/38, 39, 68–71, 137/614, 614.02; 73/333; 285/4

[56] References Cited
UNITED STATES PATENTS

| | | | |
|---|---|---|---|
| 3,478,762 | 11/1969 | McCullough | 137/71 |
| 2,083,054 | 6/1937 | Cline | 285/2 |
| 3,043,542 | 7/1962 | Neuschotz | 137/68 X |
| 3,273,578 | 9/1966 | Clark | 137/68 |
| 3,606,900 | 9/1971 | Wunderlich | 137/68 |
| 3,630,214 | 12/1971 | Levering | 137/68 |
| 3,719,194 | 3/1973 | Anderson et al. | 137/68 |

Primary Examiner—Henry T. Klinksiek
Assistant Examiner—Richard Gerard
Attorney, Agent, or Firm—Billy A. Robbins

[57] ABSTRACT

A fluid coupling assembly having a pair of housing parts which are held together by a prestressed solid bolt. The poppet valves are disposed at each end of the bolt and are spring-loaded toward respective valve seats. One of the body parts has a reduced area portion which will fracture upon application thereto of a force directed transverse to the longitudinal axis of the body parts (a side-load force) of a predetermined magnitude. The solid bolt has a reduced cross-sectional area and will fracture upon application thereto of a tensile or side-load force of a predetermined magnitude. The side-load forces and tensile forces may hereinafter be referred to as non-compressive forces even though such forces may include components compressive in nature. Upon the application of an appropriate force, both the body and the prestressed bolt will sequentially fracture releasing the poppets allowing them to engage the seats and thereby close a fluid flow path through the coupling assembly.

10 Claims, 5 Drawing Figures

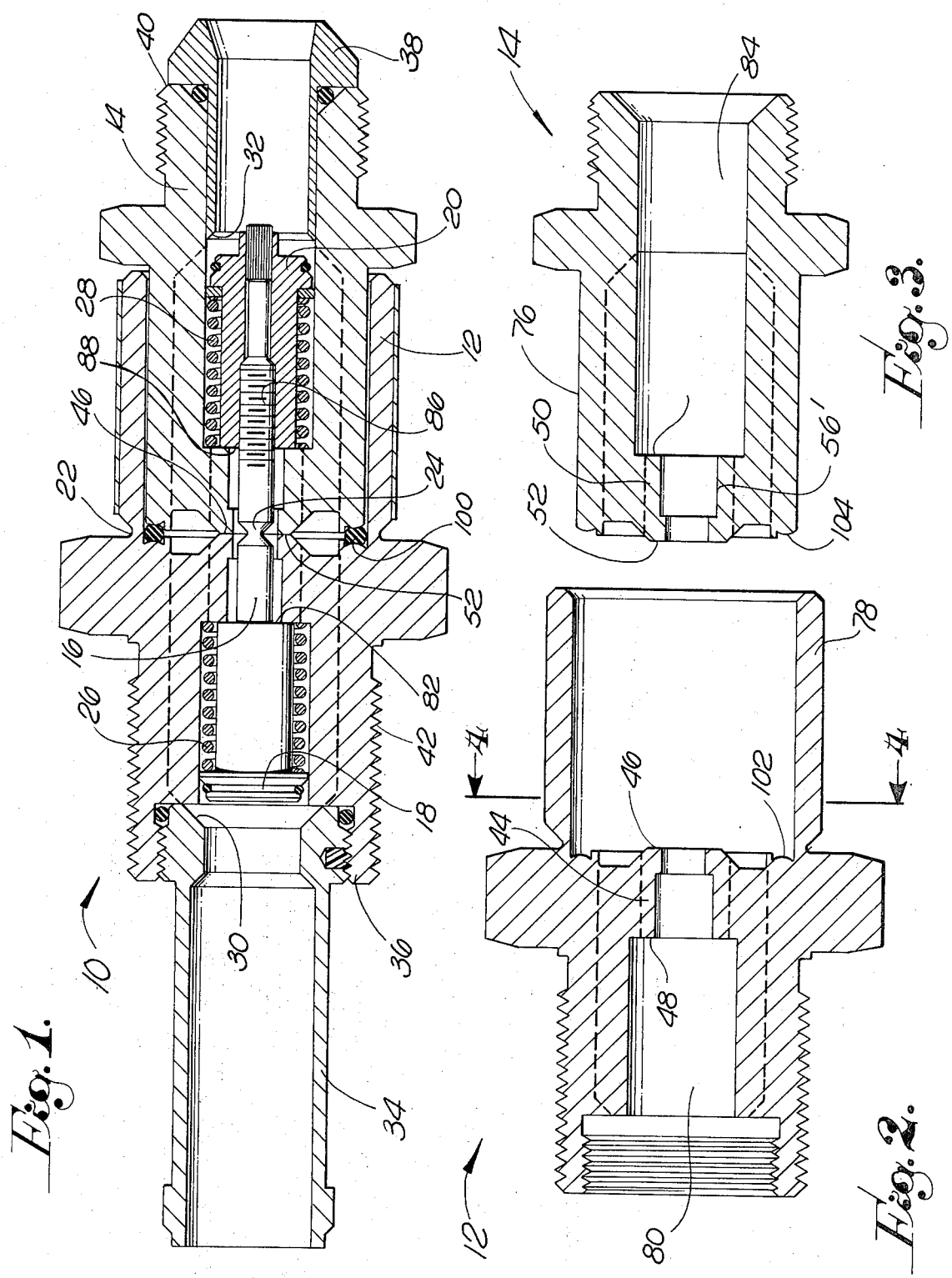

ns known to ap-
SAFETY BREAKAWAY FLUID COUPLING

BACKGROUND OF THE INVENTION

1. Field of the Invention

This invention relates to the field of safety valves and more particularly to safety valves designed to automatically close when containers, conduits, hoses or the like attached thereto are subjected to unusual non-compressive forces which would cause hoses, conduits, tanks or other fluid containing or conducting structures to separate.

2. Description of the Prior Art

The most pertinent prior art references known to applicant are U.S. Pat. Nos. 3,043,542; 3,273,578; and 3,630,214. Applicant is also aware of the other references cited in U.S. Pat. No. 3,630,214 but does not believe them to be pertinent.

BRIEF SUMMARY OF THE INVENTION

The invention comprises a fluid coupling assembly having first and second separable body parts held together by a rigid bolt means and having poppet valves disposed at opposite ends thereof. Springs urge the poppet valves toward respective seats therefor. One of the body parts and the rigid bolt have reduced cross-sectional areas. When the assembly is subjected to sufficient magnitude non-compressive forces to rupture the bolt, the springs cause the poppet valves to seat against their seats.

In accordance with a specific feature of the invention, the rigid bolt means is prestressed a predetermined amount thereby to reduce cyclical loads on the bolt at the reduced area.

BRIEF DESCRIPTION OF THE DRAWINGS

FIG. 1 is a cross-sectional view in elevation of a fluid coupling assembly embodying the features of the present invention;

FIGS. 2 and 3 illustrate the separate body parts which form a part of the structure as illustrated in FIG. 1;

DESCRIPTION OF THE INVENTION

Figure 4:
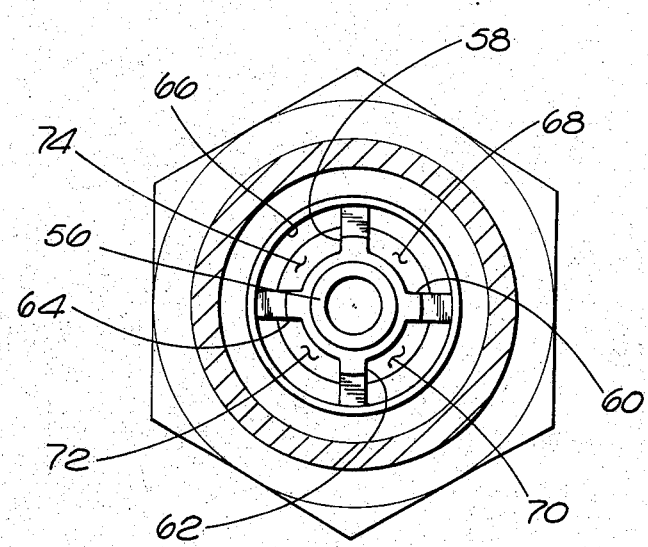
FIG. 4 is a view taken along the lines 4—4 of FIG. 2.

Referring now to the drawings, the fluid coupling assembly is shown generally at 10 and includes a first body portion 12 and a second body portion 14. The body portions 12 and 14 are coupled together by a rigid bolt means 16 having poppet members 18 and 20 disposed at each end thereof. The first body portion 12 includes a reduced cross-sectional area portion 22 substantially encircling the same. A reduced cross-sectional area portion 24 on the bolt means 16 is generally aligned, though such alignment is not essential, when the assembly is integrated and functioning normally, with the reduced area 22 on the first body portion 12. The reduced area portions may be formed in any manner desired such as a continuous or non-continuous groove, drilled-out portions, milled-out portions, or the like. A pair of springs 26 and 28 continuously urge the poppet members 18 and 20 toward valve seats 30 and 32, respectively.

A fitting 34 is threadably engaged in one end 36 of the first body portion 12 while a different fitting 38 is press-fitted into the end 40 of the second body portion 14. The two fittings 34 and 38 are designed to receive a hose and to couple into a metallic conduit, respectively. As will be readily recognized by those skilled in the art, any type or form of fitting, straight or elbow, may be utilized to accommodate the particular application involved. As will also be recognized and understood by those skilled in the art, threads 42 or similar attaching means may be utilized so as to attach the assembly to a structure such as a wall, bulkhead, tank or the like. Although shown for purposes of completeness and illustration, such fittings and attachment means form no part of the present invention.

The first body portion 12 has a inwardly-directed means 44 providing first and second radially-disposed surfaces 46 and 48 (FIGS. 2–3). The body portion 14 includes a similar inwardly-directed means 50 providing first and second radially-disposed surfaces 52 and 54, respectively. In a preferred form of the invention, the surfaces 46 and 48 are provided by an annulus 56 having a plurality of arms 58, 60, 62 and 64, radiating therefrom and into engagement with the inner wall 66 of the body portion 12 (FIG. 4). Voids 68, 70, 72 and 74 are provided between the arms 58 through 64, respectively to thereby provide a flow path for fluid through the body portion 12.

The body portion 14 defines a similar structure to that just described with respect to the body portion 12 and such is indicated by utilizing the number 56' in FIG. 3.

In assembly, the tubular extension 76 of the body portion 14 is inserted into the tubular extension 78 of the body portion 12 so that the surfaces 46 and 52 are in abutting engagement. The bolt 16 with the poppet member 18 thereon is inserted into the bore 80 of the body member 12 so that the shoulder 82 is in engagement with the surface 48. The poppet means 20 is then inserted into the bore 84 of the body portion 14 and is threaded onto the threads 86 provided on the bolt means 16 until the shoulder 88 is in engagement with the surface 54. Thereafter, the poppet means 20 is tightened to prestress the bolt means 16 and is locked in place by any means desired, for example, epoxy, to prevent inadvertent loosening or disassembly.

Such prestressing provides an assembly which will not fail in fatigue as a result of cyclical loads which may be applied thereto from operation of the vehicle into which the fluid coupling assembly has been incorporated. Such cyclical loads due to vibration or the like often result in fatigue failures. It will be recognized by those skilled in the art that by prestressing the bolt means 16, the body portions 12 and 14 must be subjected to sufficient tensile forces to overcome the prestress prior to applying further tensile forces to the bolt means 16 to cause it to rupture. However, it may also be determined with extreme accuracy the exact amount of tensile force required to cause rupture of the bolt means 16 at the reduced area 24.

Figure 5:
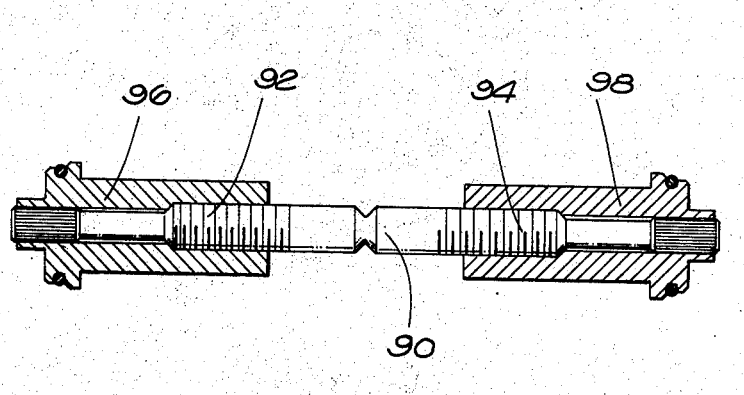
FIG. 5 illustrates an alternative subassembly of the poppet valves and interconnecting bolt means therebetween.

It will be recognized that the bolt means and poppet assemblies may be constructed in such a way that one of the poppet means such as 18 is formed integrally with the bolt 16 while the other is a separate nut-like member which is threaded onto the end of the bolt 16 as shown in FIG. 1. Alternatively, as is illustrated in FIG. 5, the bolt means 90 may be threaded at 92 and 94 and poppet means 96 and 98 threaded onto each end of the bolt means 90. In all other aspects, the assembly would be as illustrated in FIG. 1.

With the assembly as illustrated in FIG. 1 in place, it will now be recognized by those skilled in the art that under normal operating circumstances, the voids 68, 70, 72 and 74 extend through the assembly to provide the fluid flow path. An O-ring 100 is compressed between the surfaces 102 and 104 of the body portions 12 and 14 respectively and thus provides a seal to preclude leakage of fluid flowing through the assembly. Upon application of sufficient magnitude non-compressive force in bending, tension or shear, the bolt means 16 ruptures at the reduced area 24 thereby causing the body portions 12 and 14 to separate and allowing the poppet means 18 and 20 to seat against the valve seats 30 and 32, respectively, thereby immediately sealing off the fluid flow paths provided through the body portions 12 and 14. In the event the load applied is in bending, the body portion 12 first ruptures about the reduced area 22 for an amount sufficient to cause the bolt 16 to rupture with the result as above described.

From the foregoing, it will be recognized that rupture in bending or shear is controlled by the strength of the reduced area of the body portion 12, while the rupture in tension is controlled by the reduced area of the bolt 16. Through appropriate selection one may choose that portion of the coupling which will rupture first so as to provide appropriate design for any given application.

External leakage prior to rupture of the bolt means 16 is precluded by properly sizing the O-ring 100. Such proper sizing results in compression of the O-ring by an amount greater than the stretching of the bolt 16 prior to rupture. Thus, a seal is constantly maintained by the O-ring 100 between the body portions 12 and 14 until the poppets have properly seated.

It will also be recognized by those skilled in the art that the poppets are moving in a direction upon rupture of the bolt means 16 such that they are opposing the flow of fluid which would be in the conduits connected to the fittings 34 and 38. As a result the fluid coupling assembly in accordance with the present invention would automatically relieve excessive pressure surges of fluid that might occur in the conduits. That is, if pressure surges are created as a result of a catastrophe of sufficient magnitude to generate forces against the poppets 18 and 20 in excess of the design strengths of the springs 26 and 28, the poppets 18 and 20 would momentarily open to relieve those surges but would immediately thereafter close although a minor amount of relief of the fluid would occur. The valves or conduits would not be destroyed as could occur if the poppets were closing in the direction of fluid flow. Obviously, if the springs 26 and 28 are properly sized, the poppets 18 and 20 will remain seated against their valve seats 30 and 32, respectively, to contain normal pressures.

It will be immediately recognized by those skilled in the art that the construction of the assembly in accordance with the present invention provides a self-inspecting operative structure. That is, if there has been an inadvertent failure or improper assembly of the valve constructed in accordance with the present invention so that the bolt means 16 inadvertently fails, the body portions immediately and automatically separate one from the other and the failure is easily detectable. In many prior art devices, the body portions do not separate in the event of an inadvertent failure and the valves can close during what otherwise should be normal operation of the vehicle, thereby causing inability of normal operation because of loss of support fluid such as fuel, oil or the like, and this failure may not be detectable by normal visual inspection.

What is claimed is:

1. Fluid coupling assembly comprising:
separable body portions defining a fluid flow path therethrough;
rigid bolt means securing said body portions together;
one of said body portions and said rigid bolt means having reduced area, portions which are aligned during normal operation but which will fail upon application of a non-compressive load of predetermined magnitude thereto;
means for prestressing said rigid bolt means a predetermined amount less than that required to cause said bolt means to fail; and
valve means mounted in said flow path operative responsive to failure of said prestressed bolt means or said body portion having said reduced area to close said flow path.

2. Fluid coupling assembly comprising:
separable body portions defining fluid flow paths therethrough;
rigid bolt means extending through abutting parts of said body portions;
poppet means disposed at each end of said bolt means and engaging said body portions to retain said body portions together during normal operation;
one of said body portions and said bolt means defining reduced area portions which are aligned during normal operation but may fracture upon being subjected to side-load forces of predetermined value;
seat means carried by said body means; and,
spring means continuously urging said poppet means toward said seat means, whereby upon fracture of said bolt means said poppet means sealingly engage said seat means blocking said fluid flow path.

3. Fluid coupling assembly comprising:
first and second separate tubular body portions each defining a flow cavity and having inwardly-directed means defining first and second radially-disposed surfaces;
poppet valve means interconnected with rigid bolt means having a reduced cross-sectional area and extending through said inwardly-directed means releasably securing said body portions together with said first radially-disposed surfaces in abutting engagement;
one of said body portions having a reduced cross-sectional area aligned with the reduced cross-sectional area of said bolt means;
first and second spring means continuously urging said poppet valve means away from said inwardly-directed means; and,
valve seat means carried by said body means for cooperation with said poppet means to block said flow cavity when said coupling is subjected to side-load forces sufficient to rupture said bolt at said reduced area.

4. A fluid coupling assembly as defined in claim 3 wherein said poppet valve means includes first and second poppets and said valve seat means includes first and second valve seats, one of said poppets being threadably secured to said bolt means.

5. A fluid coupling assembly as defined in claim 3 wherein said second body portion is received internally of said first body portion and said first body portion has said reduced area.

6. A fluid coupling assembly as defined in claim 4 wherein the other of said poppets is formed integrally with said bolt means, said poppets being disposed on opposite ends of said bolt means.

7. A fluid coupling assembly as defined in claim 3 wherein said poppet means abuts said second surfaces.

8. A fluid coupling assembly as defined in claim 2 which further includes means for prestressing said rigid bolt means.

9. A fluid coupling assembly as defined in claim 3 which further includes means for prestressing said rigid bolt means.

10. A fluid coupling assembly as defined in claim 9 wherein said means for prestressing includes one of said poppet valve means threadably secured to said rigid bolt means, said poppet valve means engaging said second radially-disposed surfaces whereby up tightening said threadably secured poppet valve means tensile force is applied to said rigid bolt means thereby prestressing said rigid bolt means.

* * * * *